Sept. 30, 1924.  W. W. LEWIS  1,510,406
MOTOR VEHICLE
Filed July 19, 1922    4 Sheets-Sheet 3

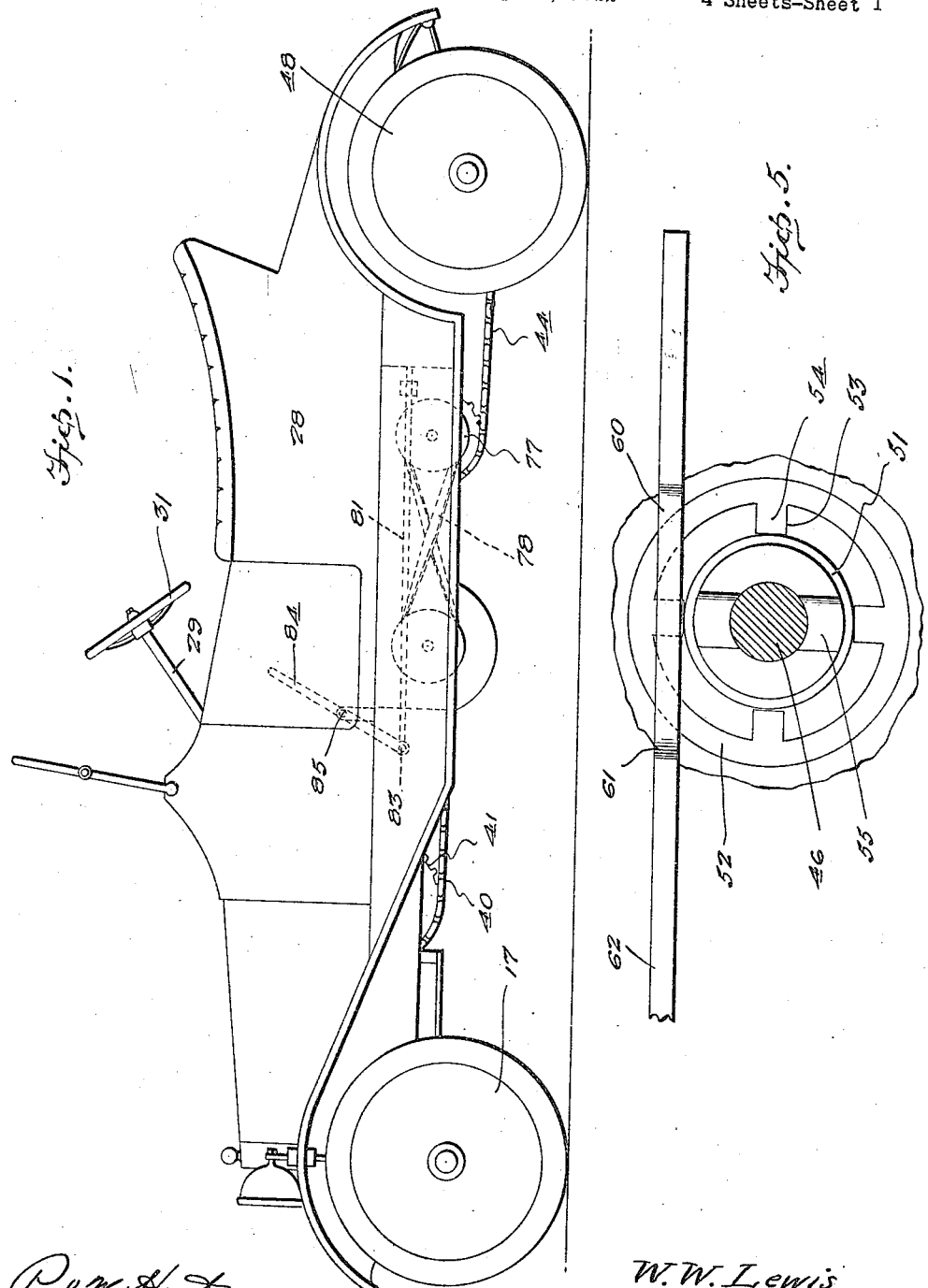

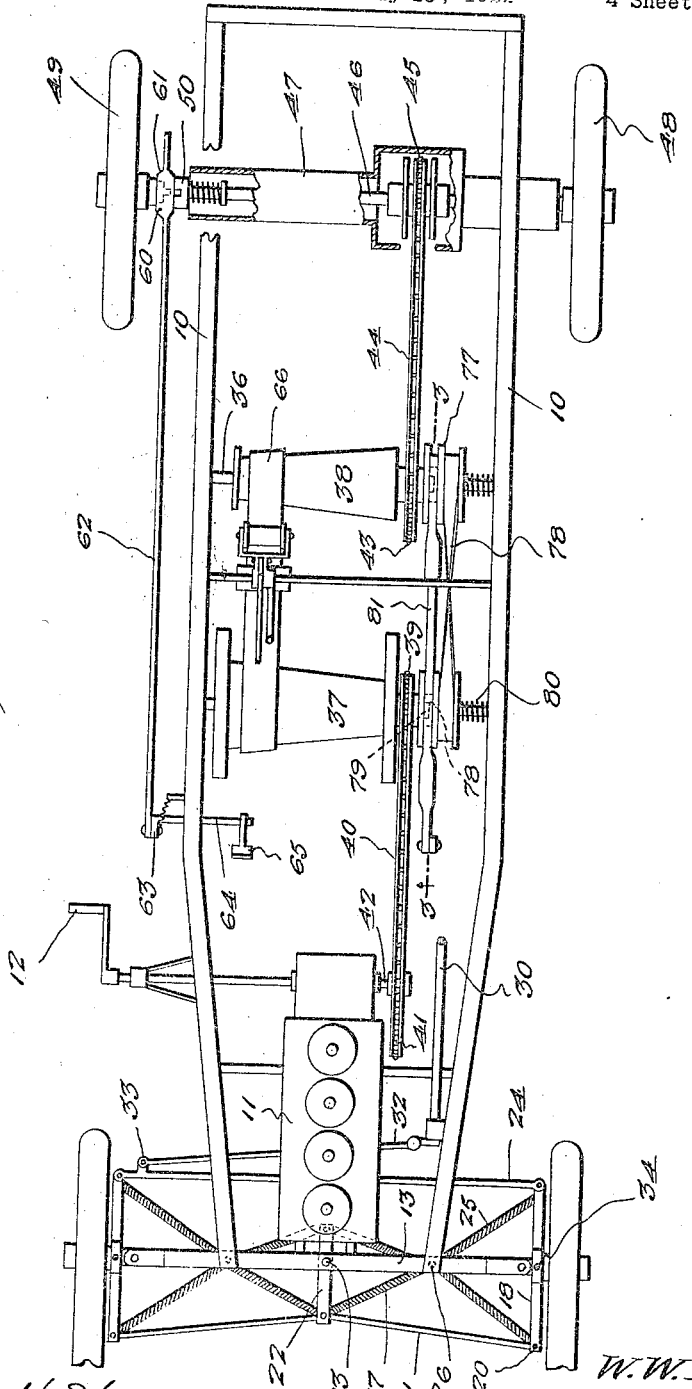

W. W. Lewis
INVENTOR
BY Victor J. Evans
ATTORNEY

Sept. 30, 1924.
W. W. LEWIS
MOTOR VEHICLE
Filed July 19, 1922
1,510,406
4 Sheets-Sheet 4
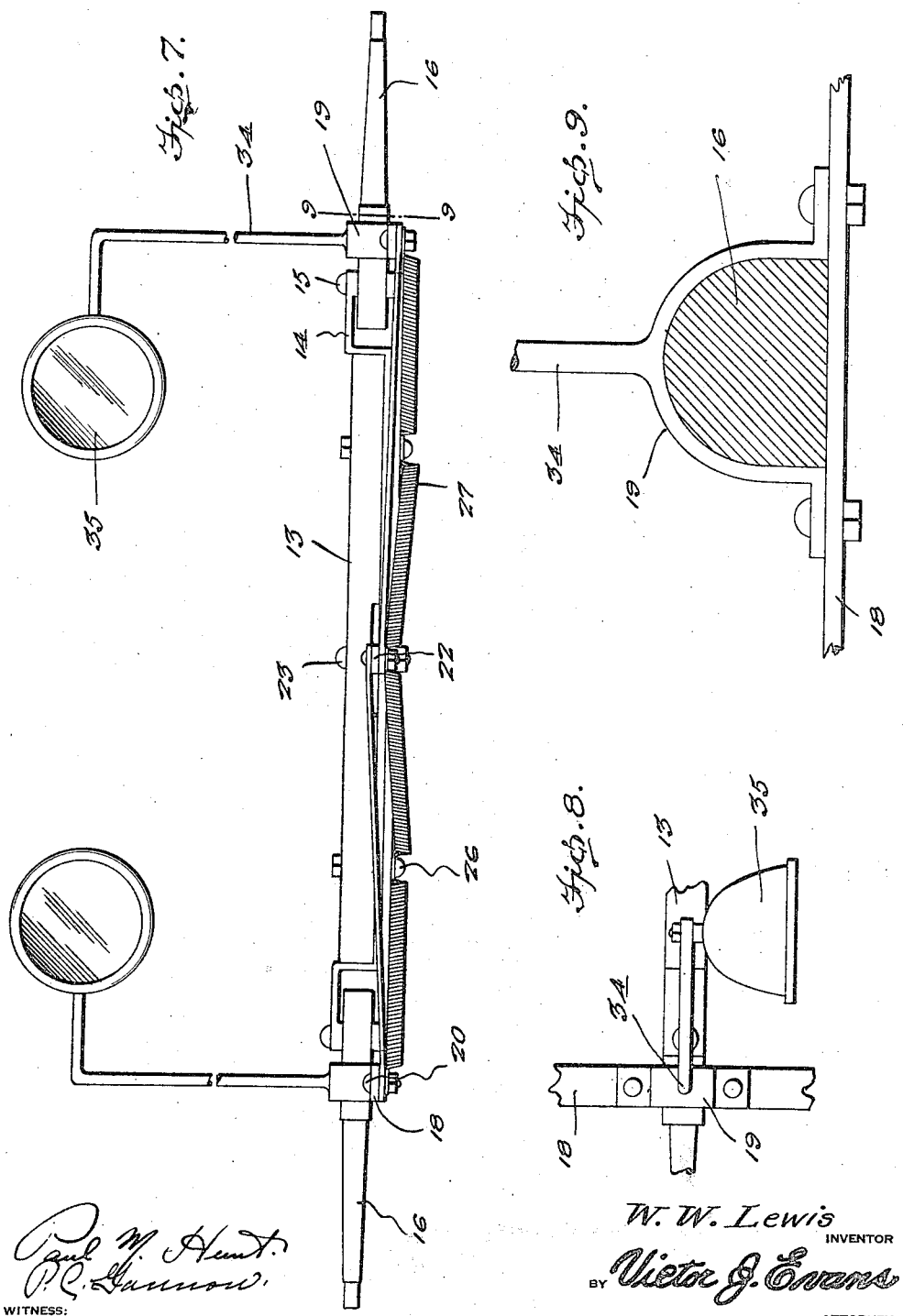

Patented Sept. 30, 1924.

1,510,406

UNITED STATES PATENT OFFICE.

WILLIAM W. LEWIS, OF COATESVILLE, PENNSYLVANIA.

MOTOR VEHICLE.

Application filed July 19, 1922. Serial No. 576,065.

*To all whom it may concern:*

Be it known that I, WILLIAM W. LEWIS, a citizen of the United States, residing at Coatesville, in the county of Chester and State of Pennsylvania, have invented new and useful Improvements in Motor Vehicles, of which the following is a specification.

This invention relates to improvements in motor vehicles and has for an object the provision of a vehicle of simple and economical construction, which may be sold at a nominal cost.

More specific, the invention aims to provide a simple, inexpensive and novel form of driving or transmission mechanism for coupling the motor and traction wheels of the vehicle, wherein the cost of production will be materially reduced and positive control of the vehicle assured.

Another object of the invention is the provision of a simple and inexpensive steering gear, which will tend to normally cause the vehicle to travel in a straight line and act as a specific means to prevent accidental turning of the vehicle.

With the above and other objects in view, the invention further includes the following novel features and details of construction, to be hereinafter more fully described, illustrated in the accompanying drawings and pointed out in the appended claim.

In the drawings:—

Figure 1 is a side elevation of a motor vehicle embodying the present invention.

Figure 2 is a top plan view of the chassis with the transmission mechanism in position thereon.

Figure 5 is a section on the line 5—5 of Figure 4.

Figure 7 is a front elevation of the front axle illustrating the manner of mounting the head lamps.

Figure 8 is a fragmentary top plan view of one end of the front axle and one of the head lamps.

Figure 9 is an enlarged sectional view on the line 9—9 of Figure 7.

Figure 4:
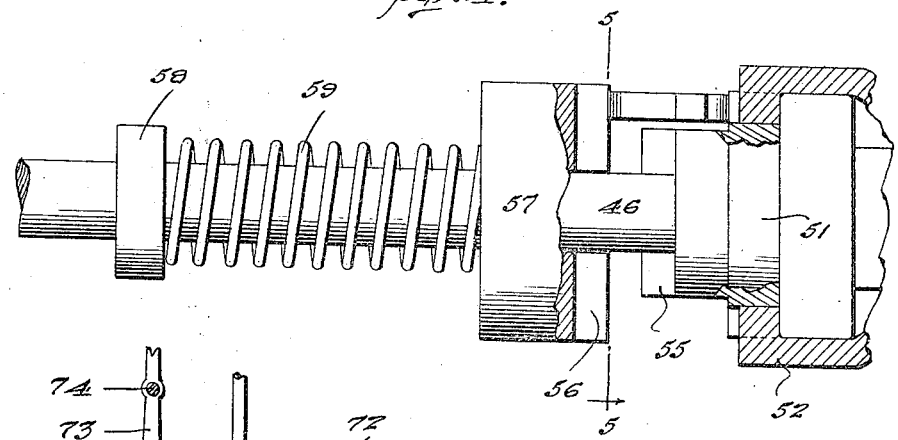
Figure 4 is a fragmentary elevation of the driving axle clutch with portions of the latter broken away and shown in section.
Figure 3:
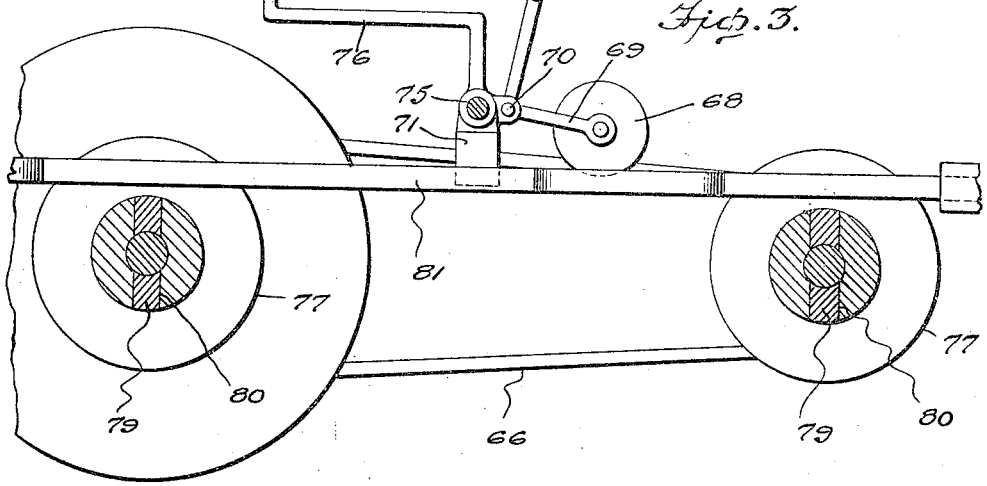
Figure 3 is an enlarged sectional view on the line 3—3 of Figure 2.
Figure 6:
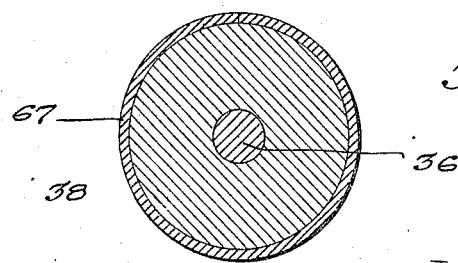
Figure 6 is a detail transverse section through one of the cone pulleys.

Referring in detail to the drawings, wherein like characters of reference denote corresponding parts, the vehicle is shown as including a frame 10 upon which is suitably mounted a motor 11, which may be of the internal combustion type and which is provided with a starting crank 12 having suitable connections with the motor.

Secured to the front end of the frame 12 is an axle 13 having spaced parallel arms 14 extending from each end thereof, while pivotally secured between these arms as shown at 15, are spindles 16, upon which the front steering wheels 17 are mounted. Connected to each of the spindles 16 are oppositely extending right angularly disposed arms 18, which are secured to the spindles by means of clamps 19. One end of each of the arms 18 has pivotally secured thereto as indicated at 20, one end of a rod 21. The inner end of each of these rods is pivotally connected to a transversely movable bar 22, which is mounted for pivotal movement beneath the axle as shown at 23. The opposite ends of the arms 18 are connected together by a rod 24, so that the spindles will move simultaneously upon their pivots 15. Connected to each end of each of the arms 18 are the outer ends of coiled springs 25, while their inner ends are connected to the front axle as shown at 26. Additional springs 27 have one of their ends connected at the point 26 while their opposite ends are connected to the opposite ends of the transversely movable pivot bar 22. By this arrangement when the spindles 16 are moved in one direction, they will be moved against the action of the springs and these springs will serve to return the wheels to their normal position as shown in Figure 1.

The body of the vehicle is shown at 28 and extending upward through the bottom or floor of this body is a steering column 29 having a post 30 extending therethrough. The upper end of this post has secured thereto a steering wheel 31, while its lower end is operatively connected to the inner end of a rod 32, while the outer end of this rod is connected to the rod 24 as shown at 33.

Extending upwardly from the clamps 19 are bracket arms 34 which carry head lamps 35. When the vehicle is steered through the operation of the wheel 31, the spindles will be moved upon their pivots 15 and these spindles will carry with them the bracket arms 34 so that the lamps 35 will have their rays of light projected in the direction of travel of the vehicle.

Mounted within the frame 10 are transversely arranged parallel shafts 36 and loosely mounted upon these shafts are cone pulleys 37 and 38, the former providing a driving pulley and the latter a driven pulley. For this purpose the pulley 37 has connected thereto a sprocket 39, which is connected by means of a chain 40 to a relatively large sprocket 41 mounted upon the shaft 42 driven by the motor 11.

The pulley 38 has also connected thereto a sprocket 43, which, by means of a chain 44 provides a sprocket 45 which is secured upon the rear driving axle 46. The sprocket 45 and the axle 46 is mounted in a housing 47 which is suitably secured to the frame 10 and the axle 46 has secured upon one end a traction wheel 48. The opposite end of the axle 46 has loosely mounted thereon a wheel 49, which is adapted to be made fast upon said axle by means of a clutch 50. This clutch includes a member 51 which is carried by the head 52 of the wheel 49 and this member is provided with spaced notches 53 which are adapted to receive teeth or lugs 54 carried by said head 52. The member 51 is provided along one face with teeth 55 which are adapted to engage slots or notches 56 provided in a member 57 loose on the axle 46. Secured to the axle 46 and spaced from the member 57 is a collar 58, while surrounding the axle between the collar 58 and member 57 is a coiled spring 59, which serves to force the member 57 toward the member 51 so that the teeth 44 will engage the notches 56. The member 57 is splined upon the axle 46 so as to rotate therewith and is normally disengaged from the member 51 so that the wheel 49 rotates idly when the vehicle is travelling and therefore furnishes no traction for the vehicle. This permits of a difference in speed of rotation of the vehicle when the latter is making a turn and acts as a substitute for the usual differential of a motor vehicle.

In order to hold the members 51 and 57 disengaged, there is provided a separating wedge 60 having oppositely beveled ends 61. This wedge 60 is carried at one end of a rod 62, which may be termed a clutch rod, the opposite end of this clutch rod being pivotally connected to a crank arm 63 carried at one end of a rock shaft 64. The opposite end of this rock shaft has suitable connection with a foot pedal 65 which extends upward through the floor of the body 28 within convenient reach of the driver. By operating the clutch pedal 65, the clutch rod 62 may be moved forward so as to permit the members 51 and 57 of the clutch to engage and lock the wheel 49 to the axle 46 to supply additional traction for the vehicle.

In order to impart motion from the driving pulley 37 to the driven pulley 38 there is provided a belt 66 which may be formed of leather or similar material, while the pulleys 37 and 38 are provided with a leather or similar casing 67 to prevent slippage between the pulleys and belt when the latter is joined. Normally however, the belt 66 is loose so that even when the motor 11 is operating no motion will be imparted to the pulley 38.

To operatively connect the pulleys 37 and 38 so that the latter will be rotated, there is provided a manually controlled belt tightener which includes a roller 68, mounted for rotation in one end of a bell crank 69, the latter being pivotally mounted as at 70 in a shifting yoke 71. The opposite end of the bell crank 69 is connected by means of a rod 72 and a control lever 73, the said lever being pivotally mounted upon a rod 74 extending transversely of the vehicle. The lever 73 extends upward through a transverse slot (not shown) in the bottom of the body 28 so that the said lever may be moved longitudinally of the rod 74, for a purpose hereinafter apparent.

The shifting yoke 71 is mounted upon a transverse rod or bar 75 and is movable longitudinally of said bar and for this purpose is provided with a shifting arm 76 which extends upward through another transverse slot (not shown) also provided in the bottom of the vehicle body 28.

When it is desired to impart motion to the vehicle, the control lever is operated to cause the roller 68 to depress the belt 66 to tighten the same so that motion from the pulley 37 will be imparted to the pulley 38 to drive the vehicle in a forward direction. The speed of operation may be controlled by shifting the belt 66 longitudinally of the pulleys 37 and 38, shifting being accomplished by means of the rods 76. By the use of this rod, the yoke 71 may be moved transversely of the vehicle and longitudinally of the pulleys so that the speed as the pulley 38 revolves may be regulated. When the rod 76 is moved transversely of the vehicle, the lever 73 must be also moved due to the fact that the roller 68 is carried by the yoke 71.

Also loosely mounted upon the shafts 36 are grooved pulleys 77, which are connected by a crossed belt 78, so that the rear pulley 77 will be rotated in a direction opposite the forward pulley. The pulleys 77 carry one member 78' of a clutch, the other member 79 extending from the adjacent face of the springs 39 and 43. The clutches thus provided are urged to a closed position by means of springs 80 which are mounted upon the shafts 36. Normally, the pulleys 77 are disengaged from the springs 39 and 43, so that the vehicle may travel forwardly. When it is desired to reverse the direction of travel, the clutch members 78' and 79 are separated. This is accomplished by means of separating wedges 81, which are spaced along a clutch rod 82, whose outer end is pivotally connected as at 83 to the lower end of a lever 84, the latter being pivotally mounted as at 85 within the vehicle and extending through an opening in the floor of the body of the vehicle. Normally, the wedges 81 are arranged between the clutch members 78' and 79, but when the wedges are in the position shown in Figure 1, the clutch members will be engaged so that when the motor 11 is operated, the sprocket 43 will rotate in a direction opposite the sprocket 39 and the vehicle will be in reverse. When the parts are in this position, pressure upon the roller 68 is relieved so that the belt 66 may travel free.

The invention is susceptible of various changes in its form, proportions and minor details of construction and the right is herein reserved to make such changes as properly fall within the scope of the appended claim.

Having described the invention what is claimed is:—

The combination with a vehicle, of a steering mechanism comprising an axle, a spindle mounted for horizontal pivotal movement at each end thereof, oppositely projecting laterally extending arms carried by each of the spindles, a centrally located arm pivotally mounted transversely of the axle, rods connecting the last mentioned arm with the spindle carried arms and springs connecting each end of each of the arms and secured to the axle at a point upon each side of and intermediate the center and the ends of the axle to normally maintain the spindles in alignment.

In testimony whereof I affix my signature.

WILLIAM W. LEWIS.